US012760883B2

(12) United States Patent
Jha et al.

(10) Patent No.: US 12,760,883 B2
(45) Date of Patent: Oct. 13, 2026

(54) AIRCRAFT TAIL LIGHT, AIRCRAFT COMPRISING AN AIRCRAFT TAIL LIGHT, AND METHOD OF OPERATING AN AIRCRAFT TAIL LIGHT

(71) Applicant: Goodrich Lighting Systems GmbH & Co. KG, Lippstadt (DE)

(72) Inventors: Anil Kumar Jha, Lippstadt (DE); Andre Hessling von Heimendahl, Koblenz (DE); Marion Depta, Lippstadt (DE)

(73) Assignee: GOODRICH LIGHTING SYSTEMS GMBH & CO. KG, Lippstadt (DE)

(*) Notice: Subject to any disclaimer, the term of this patent is extended or adjusted under 35 U.S.C. 154(b) by 0 days.

(21) Appl. No.: 19/270,205

(22) Filed: Jul. 15, 2025

(65) Prior Publication Data

US 2026/0022829 A1 Jan. 22, 2026

(30) Foreign Application Priority Data

Jul. 18, 2024 (EP) .................................... 24189607

(51) Int. Cl.

| | |
|---|---|
| ***B64D 47/02*** | (2006.01) |
| ***B64D 45/00*** | (2006.01) |
| ***B64D 47/06*** | (2006.01) |
| ***F21V 29/50*** | (2015.01) |
| ***F21W 107/30*** | (2018.01) |

(52) U.S. Cl.
CPC .............. *F21V 29/50* (2015.01); *B64D 45/00* (2013.01); *B64D 47/06* (2013.01); *B64D 2203/00* (2013.01); *F21W 2107/30* (2018.01)

(58) Field of Classification Search
CPC .... B64D 47/02; B64D 47/06; B64D 2203/00; F21W 2107/30
See application file for complete search history.

(56) References Cited

U.S. PATENT DOCUMENTS

| | | |
|---|---|---|
| 8,956,021 B2 | 2/2015 | Hessling |
| 9,132,923 B2 | 9/2015 | Hessling |
| 9,771,168 B2 | 9/2017 | Hessling |

(Continued)

FOREIGN PATENT DOCUMENTS

| | | |
|---|---|---|
| EP | 2813765 | 7/2016 |

OTHER PUBLICATIONS

European Patent Office, European Search Report dated Jan. 28, 2025 in Application No. 24189607.5.

*Primary Examiner* — Sean P Gramling
(74) *Attorney, Agent, or Firm* — SNELL & WILMER L.L.P.

(57) ABSTRACT

An aircraft tail light for being installed adjacent a hot gas exhaust of an aircraft comprises: at least one light source for generating a light output of the aircraft tail light and a heat transfer structure. The at least one light source is arranged in an aircraft exterior portion of the aircraft tail light. The heat transfer structure comprises a heat receiving portion, thermally coupled with the at least one light source for absorbing heat (H) from the at least one light source, and a heat dispensing portion for dispensing heat (H) from the heat transfer structure. The heat transfer structure extends from the aircraft exterior portion of the aircraft tail light to an aircraft interior portion of the aircraft tail light.

16 Claims, 6 Drawing Sheets

(56) References Cited

U.S. PATENT DOCUMENTS

| | | | | |
|---|---|---|---|---|
| 2005/0201112 | A1* | 9/2005 | Machi .................... | B64D 47/06 362/547 |
| 2023/0124624 | A1* | 4/2023 | Shivarudra Gowda ...................... | B64D 47/06 315/77 |
| 2023/0408059 | A1 | 12/2023 | Acharya et al. | |

* cited by examiner

AIRCRAFT TAIL LIGHT, AIRCRAFT COMPRISING AN AIRCRAFT TAIL LIGHT, AND METHOD OF OPERATING AN AIRCRAFT TAIL LIGHT

CROSS-REFERENCE TO RELATED APPLICATIONS

This application claims priority to EP patent application Ser. No. 24/189,607.5, filed Jul. 18, 2024 and titled "AIRCRAFT TAIL LIGHT, AIRCRAFT COMPRISING AN AIRCRAFT TAIL LIGHT, AND METHOD OF OPERATING AN AIRCRAFT TAIL LIGHT," which is incorporated by reference herein in its entirety for all purposes.

FIELD

The present invention is in the field of aircraft lighting, in particular in the field of exterior aircraft lighting. More particularly, the present invention is in the field of aircraft tail lights, located at the tail of an aircraft. The present invention is further related to aircraft comprising at least one aircraft tail light, and to a method of operating an aircraft tail light.

BACKGROUND

Modern aircraft are equipped with a vast range of aircraft lights, including a variety of exterior aircraft lights, such as aircraft headlights, aircraft navigation lights, aircraft anti-collision lights, etc.

Some exterior aircraft lights, such as aircraft navigation lights and aircraft anti-collision lights, may be arranged at the tail of the aircraft for emitting light into an area behind the aircraft.

Many aircraft, in particular commercial aircraft, are equipped with an auxiliary power unit (APU) for providing electric energy independently of and/or additionally to the electric energy provided by the generators driven by the engines. Frequently, the auxiliary power unit is located in a rear portion of the aircraft close to the tail. The auxiliary power unit may have an exhaust for emitting hot exhaust gases, which are produced during the operation of the auxiliary power unit. In some flight conditions of the aircraft, for example during the climb of the aircraft, heat from the hot exhaust gases, emitted by the auxiliary power unit, may heat up and adversely affect aircraft tail lights located adjacent to the exhaust. The heat from the hot exhaust gases may, in particular, cause overheating of the aircraft tail lights.

Accordingly, it would be beneficial to provide an aircraft tail light that allows for reducing the risk of overheating, even when installed at the tail of an aircraft adjacent to an auxiliary power unit.

SUMMARY

Exemplary embodiments of the invention include an aircraft tail light for being installed adjacent a hot gas exhaust of an aircraft, such as to be exposed to hot exhaust gases emitted through the hot gas exhaust of an auxiliary power unit. The aircraft tail light comprises at least one light source for generating a light output of the aircraft tail light and a heat transfer structure. The heat transfer structure is configured for dissipating heat from the at least one light source and comprises a heat receiving portion, which is thermally coupled with the at least one light source for absorbing heat from the at least one light source, and a heat dispensing portion for dispensing heat from the heat transfer structure. The at least one light source is arranged in an aircraft exterior portion of the aircraft tail light and the heat transfer structure extends from the aircraft exterior portion of the aircraft tail light into an aircraft interior portion of the aircraft tail light. The heat receiving portion is arranged in the aircraft exterior portion of the aircraft tail light and the heat dispensing portion is arranged in the aircraft interior portion of the aircraft tail light. The heat dispensing portion may be formed such as to extend into an interior of the aircraft, in particular into a cavity formed within the aircraft, when the aircraft tail light is mounted to the aircraft.

In an aircraft tail light according to exemplary embodiments of the invention, the heat generated by the at least one light source, and potentially additional heat, which may reach the aircraft exterior portion of the aircraft tail light from the hot gas exhaust of the aircraft, may be transferred away from the hot aircraft exterior portion of the aircraft tail light into the aircraft, in particular into a cavity formed within the aircraft, in which the temperatures are lower.

Traditionally, heat generated by exterior aircraft lights is not transferred into, but out of the aircraft for being released to the environment, in particular to a cooling airstream passing the exterior of the aircraft during flight or taxiing. The inventors found that under special conditions, as in the case of an aircraft tail light that is arranged adjacent to an exhaust emitting hot gases, it may be beneficial to transfer the heat not out of the aircraft, but into the aircraft. In particular, it has been found to be beneficial to transfer the heat into an interior space of the aircraft, in which the temperatures are lower than in the vicinity of the aircraft tail light outside the aircraft. This may in particular be the case, where a power unit at the tail of the aircraft is used in climb scenarios, where the angle of attack and/or the aerodynamics of the aircraft direct the hot exhaust gases closer along the aircraft tail light, as compared to an operation of the power unit on the ground.

As a result, the heat may be reliably and efficiently dissipated from the aircraft tail light and the risk of damaging the aircraft tail light due to overheating may be considerably reduced. The interior space of the aircraft may act as an effective heat sink over a wide range of operating conditions.

In an embodiment, the aircraft tail light comprises a mounting structure for fixing the aircraft tail light to an aircraft skin of the aircraft. The mounting structure may be configured for fixing the aircraft tail light to the aircraft skin in a configuration in which the aircraft exterior portion is on an outside of the aircraft skin and the aircraft interior portion is on an inside of the aircraft skin. The resulting extension of the heat transfer structure through the aircraft skin may allow for a particularly efficient transfer of heat from the aircraft exterior portion of the aircraft tail light into the interior of the aircraft.

In an embodiment, the aircraft tail light is configured to be installed adjacent the hot gas exhaust of the aircraft. An aircraft tail light according to an exemplary embodiment of the invention may be installed adjacent the hot gas exhaust of the aircraft without the risk of being damaged by the hot exhaust gases, emitted via the hot gas exhaust. This may allow for additional flexibility in arranging the auxiliary power unit and the aircraft tail light within and at the aircraft and/or additional flexibility in using the auxiliary power unit in flight scenarios where the hot exhaust gases pass the aircraft tail light very closely.

In an embodiment, the aircraft interior portion may be arranged in an auxiliary power unit bay of the aircraft. The temperatures in the auxiliary power unit bay are usually low enough for allowing the transfer of heat from the hot aircraft exterior portion of the aircraft tail light into the auxiliary power unit bay, in order to cool the hot aircraft exterior portion of the aircraft tail light.

In an embodiment, the interior of the aircraft, in particular the auxiliary power unit bay, may be configured such that an air flow, in particular a thermally driven air flow, passes by the heat dispensing portion of the heat transfer structure. The air flow may support and enhance the dispensing of heat from the heat dispensing portion of the heat transfer structure for enhancing the cooling effect provided by the heat transfer structure.

The air flow may have a temperature in the range of between 50° C. and 90° C., in particular a temperature in the range of between 60° C. and 80° C., more particularly a temperature in the range of between 65° C. and 75° C. An air flow in this temperature range is well suited for absorbing heat from the heat dispensing portion of the heat transfer structure.

In an embodiment, the heat transfer structure further comprises a plurality of heat transfer ribs, extending between the aircraft exterior portion and the aircraft interior portion of the aircraft tail light. Such a plurality of heat transfer ribs may be particularly well-suited for enhancing the transfer of heat via the heat transfer structure. The plurality of heat transfer ribs may in particular enhance the transfer of heat from the heat transfer structure to an air flow passing the heat transfer structure/passing the heat dispensing portion.

In an embodiment, the aircraft tail light further comprises a thermal shield, for shielding the at least one light source from heat from the hot gas exhaust, to which the aircraft tail light may be exposed. Such a thermal shield may allow for reducing the temperature increase effects at the aircraft exterior portion of the aircraft tail light due to the hot gas exhaust. In particular, such a thermal shield may allow for reducing the temperature increase effects with respect to the at least one light source. In consequence, the risk of overheating the at least one light source may be further reduced, and the lifespan of the at least one light source may be extended.

In an embodiment, the thermal shield comprises a hot mirror, which is in particular reflective for infrared radiation. Being reflective for infrared radiation is to be understood as the hot mirror being much more reflective for electromagnetic radiation in the infrared range, having wavelengths in the range of between 700 nm and 1 mm, than for electromagnetic radiation in the range of visible light, having wavelengths in the range of between 400 nm and 700 nm. A thermal shield comprising such a hot mirror may allow for effectively protecting the at least one light source from being heated by infrared radiation. It may simultaneously allow for visible light, which is emitted by the at least one light source, to pass through the hot mirror without substantial losses.

The hot mirror may, for example, be configured for reflecting at least 80%, in particular at least 90% of infrared radiation, which impinges on the hot mirror, and for reflecting less than 20%, in particular less than 10%, of radiation in the range of visible light, which impinges on the hot mirror.

The hot mirror may be made of a material comprising an optically transparent carrier, such as glass, and a sub-micron thick coating that reflects radio-magnetic emissions beyond the visible range, such as an indium tin oxide (ITO) coating or another suitable combination of dielectric and metallic coatings. In a particular example, the hot mirror may be made of a borosilicate or soda-lime glass with a multilayer ITO coating, creating a set of interferences suited to pass through visible light and block/reflect infrared light.

In an embodiment, the thermal shield has a flat shape. A thermal shield having a flat shape may be produced comparably easily and at low costs.

In an embodiment, the thermal shield has a curved shape. The thermal shield may also comprise a flat portion having a flat shape, and a curved portion having a curved shape.

A thermal shield having an at least partially curved shape may be more efficient in shielding the light source from heat, particularly from infrared radiation. Also, a thermal shield having an at least partially curved shape may be embedded/integrated into the aircraft tail light in a more compact manner.

In an embodiment, the aircraft tail light comprises a support structure for supporting the thermal shield. The thermal shield and the support structure may be arranged outside or inside the aircraft tail light.

In an embodiment, the aircraft tail light comprises a protective cover, and the thermal shield and the support structure may be arranged outside or inside the protective cover.

In an embodiment, the aircraft tail light comprises at least one optical element, for forming the light output of the aircraft tail light from light emitted by the at least one light source. The at least one optical element may comprise at least one lens, at least one reflector, at least one shutter, or a combination of at least two, in particular of exactly two or all three, of these elements. The transfer of heat from the aircraft exterior portion to the aircraft interior portion, as described herein, may also help in protecting the at least one optical element from heat-induced adverse effects. The at least one optical element may be present in embodiments with the thermal shield and in embodiments without the thermal shield.

In an embodiment, the thermal shield is arranged between the at least one optical element and the at least one light source.

In an embodiment, the aircraft tail light comprises a protective cover, and the thermal shield is arranged between the at least one optical element and the protective cover.

In an embodiment, the thermal shield comprises a infrared reflective layer or coating applied to one or more or all of the at least one the optical element. The infrared reflective layer or coating may in particular be applied to a surface of the at least one optical element facing the at least one light source and/or to a surface of the at least one optical element facing away from the at least one light source.

In an embodiment, the infrared reflective layer or coating is applied to a flat surface of the at least one optical element.

In an embodiment, the infrared reflective layer or coating is applied to a curved surface of the at least one optical element.

The infrared reflective layer or coating may comprise an indium tin oxide (ITO) coating. It may also be made from any other suitable material or combination of materials, for example from a suitable combination of dielectric and metallic coatings.

In an embodiment, the aircraft tail light comprises a protective cover, which is at least partially formed from a thermally insulating material. Such a protective cover may provide additional thermal insulation between the at least one light source and the potentially hot environment adjacent to the aircraft tail light.

The thermally insulating material may in particular comprise/may be mode of at least one of PES, PPS, PPSU and PEEK/PEKK.

In an embodiment, the aircraft tail light is one of an aircraft navigation light, an aircraft anti-collision light, and a combined aircraft navigation and anti-collision light. Aircraft navigation lights and aircraft anti-collision lights are typical exterior aircraft lights installed at the tail of the aircraft for emitting light into an area behind the aircraft. These kinds of exterior aircraft lights may be protected particularly well by the heat transfer into the interior of the aircraft, as described herein.

In order to fulfill aircraft safety requirements and regulations, the aircraft tail light may be configured for emitting a light output having a opening angle of at least 140° in the horizontal direction when the aircraft tail light is mounted to the aircraft.

Exemplary embodiments of the invention further include an aircraft, such as an airplane or a helicopter, which is equipped with at least one aircraft tail light according to an exemplary embodiment of the invention. The aircraft tail light is mounted to the aircraft with the heat dispensing portion of the heat transfer structure being arranged within the aircraft, in particular in a cavity formed within the aircraft.

The additional features, modifications and effects, as described above with respect to the aircraft tail light, apply to such an aircraft in an analogous manner.

The aircraft tail light may in particular be installed adjacent a hot gas exhaust of the aircraft, such as to be exposed to hot gases discharged through the hot gas exhaust.

In an embodiment, the aircraft tail light and the cavity are located at the tail of the aircraft. The aircraft tail light and the cavity may in particular be located below the horizontal and vertical stabilizers at the tail of the aircraft.

In an embodiment, the aircraft comprises an auxiliary power unit (APU), the hot gas exhaust is an exhaust of the auxiliary power unit, and the cavity is an auxiliary power unit bay, housing the auxiliary power unit.

Such a configuration may allow for an effective arrangement of the auxiliary power unit and the aircraft tail light at and within the aircraft, having a low risk of overheating the at least one light source of the aircraft tail light. The auxiliary power unit bay has been found as being well-suited for dispensing the heat generated by the aircraft tail light.

In an embodiment, the cavity is configured such that an air flow passes by the heat dispensing portion of the heat transfer structure. The air flow may be a thermally driven air flow, in particular an air flow that is driven by the heat generated by operating the aircraft tail light and/or the auxiliary power unit.

Exemplary embodiments of the invention further include a method of operating an aircraft tail light according to an exemplary embodiment of the invention. The method may include operating the at least one light source for generating the light output of the aircraft tail light and passing an air flow by the heat dispensing portion of the heat transfer structure for dissipating heat from the heat dispensing portion. The heat dispensing portion may in particular be arranged in a cavity within the aircraft, and the air flow may flow through said cavity.

The additional features, modifications and effects, as described with respect to aircraft tail lights according to exemplary embodiments of the invention, apply to the method of operating an aircraft tail light in an analogous manner.

The air flow may have a temperature in the range of between 50° C. and 90° C., in particular a temperature in the range of between 60° C. and 80° C., more particularly a temperature in the range of between 65° C. and 75° C. An air flow in this temperature range is well suited for absorbing heat from the heat dispensing portion of the heat transfer structure.

It is stressed that some of the heat protection measures, as described herein, may also be implemented without the heat transfer structure, extending from the aircraft exterior portion to the aircraft interior portion, and that such embodiments are considered inventive as well. In particular, the provision of an aircraft tail light with a thermal shield and the provision of an aircraft tail light with a protective cover made of a thermally insulating material and/or with an exterior mounting structure made of a thermally insulating material are considered their own inventions. Accordingly, the following embodiments are considered their own inventions and are explicitly disclosed as such.

Exemplary embodiments of the invention include an aircraft tail light for being installed adjacent a hot gas exhaust of an aircraft, the aircraft tail light comprising: at least one light source for generating a light output of the aircraft tail light; and a thermal shield for shielding the at least one light source from heat from the hot gas exhaust, to which the aircraft tail light is exposed. The thermal shield may comprise a hot mirror, which is reflective for infrared radiation. In particular, the hot mirror may be substantially more reflective for infrared radiation than for visible light. The additional features, modifications and effects, as described herein with respect to other embodiments of the aircraft tail light, are applicable in an analogous manner.

Exemplary embodiments of the invention further include an aircraft tail light for being installed adjacent a hot gas exhaust of an aircraft, the aircraft tail light comprising: at least one light source for generating a light output of the aircraft tail light; and a light transmissive protective cover, which is at least partially formed from a thermally insulating material, and/or an exterior mounting structure/exterior housing, which is at least partially formed from a thermally insulating material. The thermally insulating material may comprise at least one of PES, PPS, PPSU and PEEK/PEKK. The additional features, modifications and effects, as described herein with respect to other embodiments of the aircraft tail light, are applicable in an analogous manner.

BRIEF DESCRIPTION OF THE DRAWINGS

Further exemplary embodiments of the invention are described in the following with respect to the accompanying drawings, wherein.

DETAILED DESCRIPTION

Figure 1:
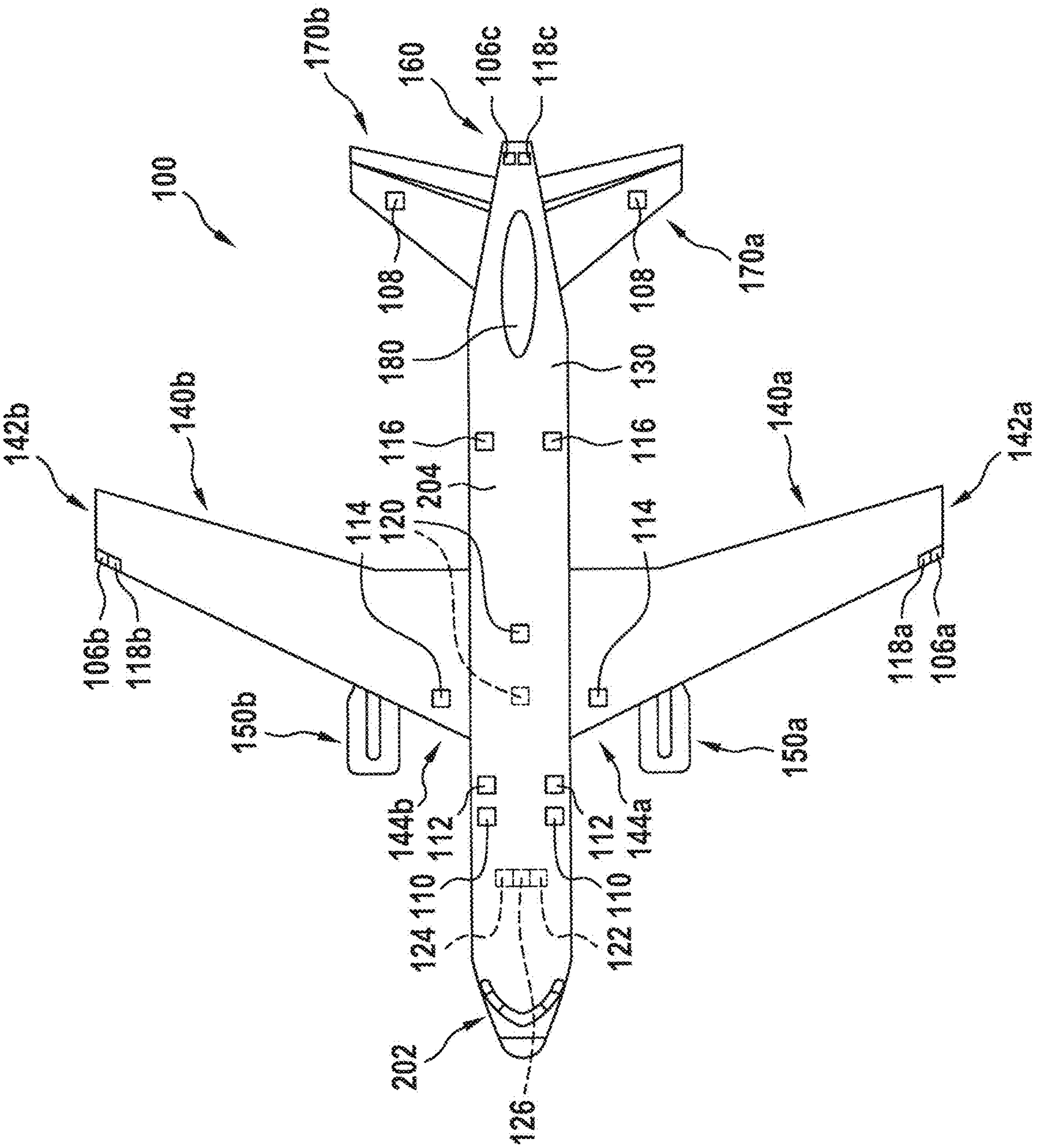
FIG. 1 depicts a schematic top view of an aircraft according to an exemplary embodiment of the invention, which is equipped with a variety of exterior aircraft lights.

FIG. 1 shows a schematic top view of an aircraft 100 according to an exemplary embodiment of the invention. The aircraft 100 is an airplane, comprising a fuselage 130, which houses a cockpit 202 and a passenger cabin 204, and two wings 140*a*, 140*b*, extending from the fuselage 130. Two horizontal stabilizers 170*a*, 170*b* and a vertical stabilizer 180 extend from a rear portion of the fuselage 130. A respective engine 150*a*, 150*b* is mounted to each of the wings 140*a*, 140*b*.

The aircraft 100 depicted in FIG. 1 is equipped with a wide variety of exterior lights. In particular, the aircraft 100 is equipped with three navigation lights 106*a*-106*c*, two logo lights 108, two wing scan lights 110, two engine scan lights 112, two runway turn-off lights 114, two cargo loading lights 116, three white strobe anti-collision lights 118*a*-118*c*, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown in FIG. 1.

A port side navigation light 106*a*, emitting light having red color, is arranged at the wing tip 142*a* of the left wing 140*a*. A starboard navigation light 106*b*, emitting light having green color, is arranged at the wing tip 142*b* of the right wing 140*b*. A tail navigation light 106*c*, emitting light having white color, is positioned at the tail 160 of the aircraft 100.

The different colors of the light outputs, as emitted by the different navigation lights 106*a*-106*c*, indicate to the aircraft environment if they are looking at the port side, at the starboard side or at the tail side of the aircraft 100. The navigation lights 106*a*-106*c* are normally activated during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144*a*, 144*b* of the wings 140*a*, 140*b* of the aircraft 100. The wing scan lights 110 and the engine scan lights 112 are normally off during the flight and may be switched on periodically or upon reasonable cause by the pilots or by the aircrew, in order to check the wings 140*a*, 140*b* and the engines 150*a*, 150*b* of the aircraft 100.

The runway turn-off lights 114 are positioned in the roots 144*a*, 144*b* of the wings 140*a*, 140*b*. The runway turn-off lights 114 are directed forwards and are normally switched off during the flight and switched on during taxiing, at least at night.

The cargo loading lights 116 are positioned on the left and right sides of the fuselage 130, behind the wings 140*a*, 140*b* and in front of the tail structure of the aircraft 100. They are normally switched off during the flight of the aircraft 100.

A white wing strobe anti-collision light 118*a*-118*b* is positioned in the left and right wing tip 142*a*, 142*b*, respectively. A white tail strobe anti-collision light 118*c* is positioned at the tail 160 of the aircraft 100. During normal operation of the aircraft 100, the white strobe anti-collision lights 118*a*-118*b* emit respective sequences of white light flashes. It is also possible that the white strobe anti-collision lights 118*a*-118*b* are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1. The red-flashing anti-collision beacon lights 120 are normally switched on during taxiing and during take-off and landing. Their output is perceived as a sequence of red light flashes in a given viewing direction. In alternative configurations, three red-flashing anti-collision beacon lights may be provided alongside or integrated with the white strobe anti-collision lights 118*a*-118*b*.

In the embodiment depicted in FIG. 1, the runway turn-off lights 114 are located in the wings 140*a*, 140*b*, in particular in the roots 144*a*, 144*b* of the wings 140*a*, 140*b*, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140*a*, 140*b*, in particular in the roots 144*a*, 144*b* of the wings 140*a*, 140*b*, of the aircraft 100.

The aircraft 100 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 100, they are also depicted in phantom in FIG. 1.

Each of the tail navigation light 106*c* and the tail anti-collision light 118*c* may be an aircraft tail light in accordance with an exemplary embodiment of the invention. In particular, it is possible that either one or both of the tail navigation light 106*c* and the tail anti-collision light 118*c* is/are an aircraft tail light in accordance with an exemplary embodiment of the invention. It is also possible that a combined aircraft tail light in accordance with an exemplary embodiment of the invention is provided at the tail of the aircraft 100, with the combined aircraft tail light providing the functionalities of the tail navigation light 106*c* and the tail anti-collision light 118*c*. Having an aircraft tail light in accordance with an exemplary embodiment of the invention, the aircraft 100 is an aircraft in accordance with an exemplary embodiment of the invention.

Figure 2:
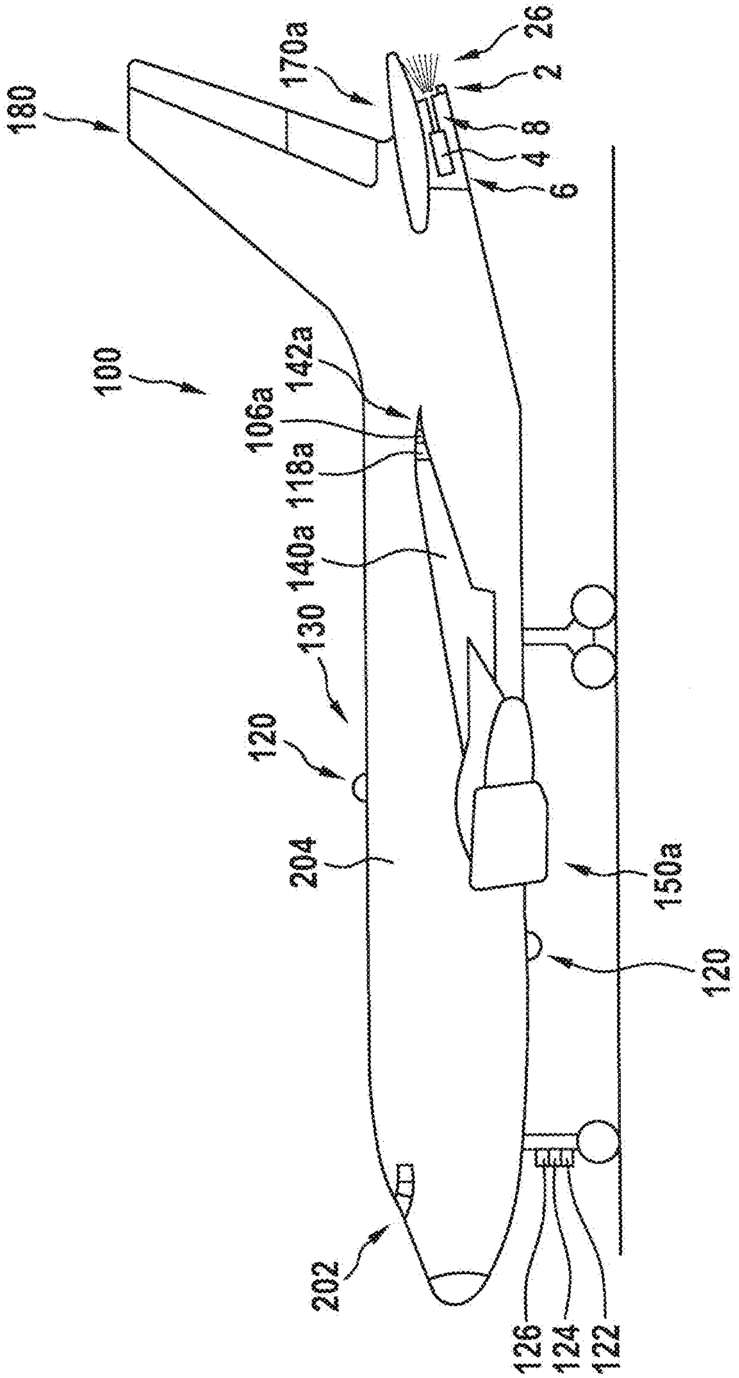
FIG. 2 depicts a schematic side view of an aircraft according to an exemplary embodiment of the invention, which is equipped with at least one aircraft tail light in accordance with an exemplary embodiment of the invention.

FIG. 2 shows a schematic side view of an aircraft 100 according to an exemplary embodiment of the invention, as it is depicted in FIG. 1. In order to enhance the clarity of the illustration, only a single aircraft tail light 2 is depicted in FIG. 2. The aircraft tail light 2 may be a tail navigation light 106*c*, as described with respect to FIG. 1, or a tail anti-collision light 118*c*, as described with respect to FIG. 1, or a combined tail navigation and anti-collision light, providing the functionalities of a tail navigation light 106*c* and a tail anti-collision light 118*c*. The aircraft 100 may comprise a least one additional aircraft tail light, which is not depicted in FIG. 2.

The aircraft 100 further comprises an auxiliary power unit (APU) 4, which may be located in a rear portion of the aircraft 100 close to of within the tail 160. The auxiliary power unit 4 may, in particular, be arranged in an auxiliary power unit bay 6, which is formed at the tail 160 of the aircraft 100. The auxiliary power unit 4 is equipped with a gas exhaust 8 for emitting hot exhaust gases 26, which are produced during the operation of the auxiliary power unit 4.

When the auxiliary power unit 4 is operated in specific flight conditions of the aircraft 100, for example during a climb of the aircraft 100, heat from the hot exhaust gases 26, emitted by the auxiliary power unit 4, may heat up the aircraft tail light 2. The heat from the hot exhaust gases 26 may, in particular, lead to a risk of overheating the aircraft tail light 2.

Figure 3:
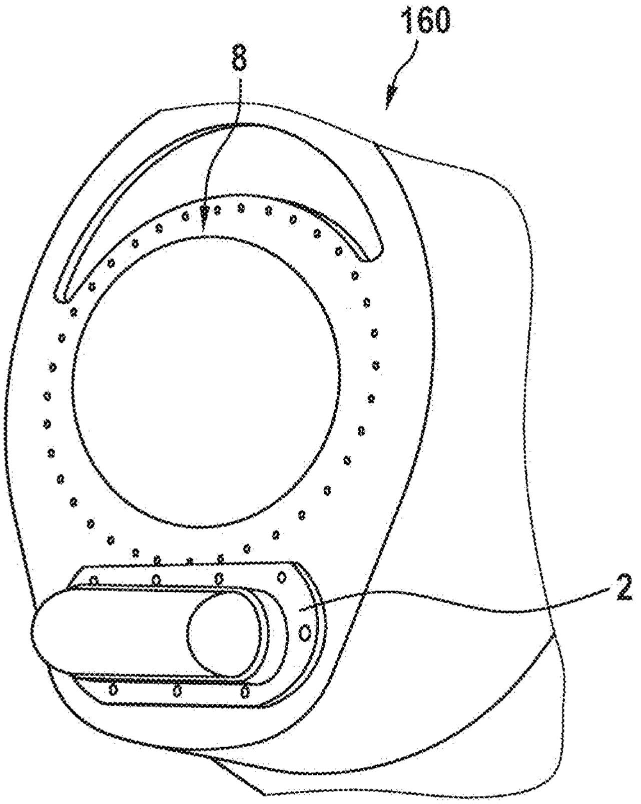
FIG. 3 depicts a perspective view of the tail of the aircraft of FIG. 2, with an exhaust and an aircraft tail light according to an exemplary embodiment of the invention being shown.

FIG. 3 shows a tail 160 of an aircraft 100, comprising a gas exhaust 8 of an auxiliary power unit 4 (not shown), and an aircraft tail light 2, which is mounted to the tail 160 of the aircraft 100 below the gas exhaust 8, in a perspective view. The tail 160, as depicted in FIG. 3, may be the tail 160 of the aircraft 100, depicted in FIGS. 1 and/or 2.

Figure 4:
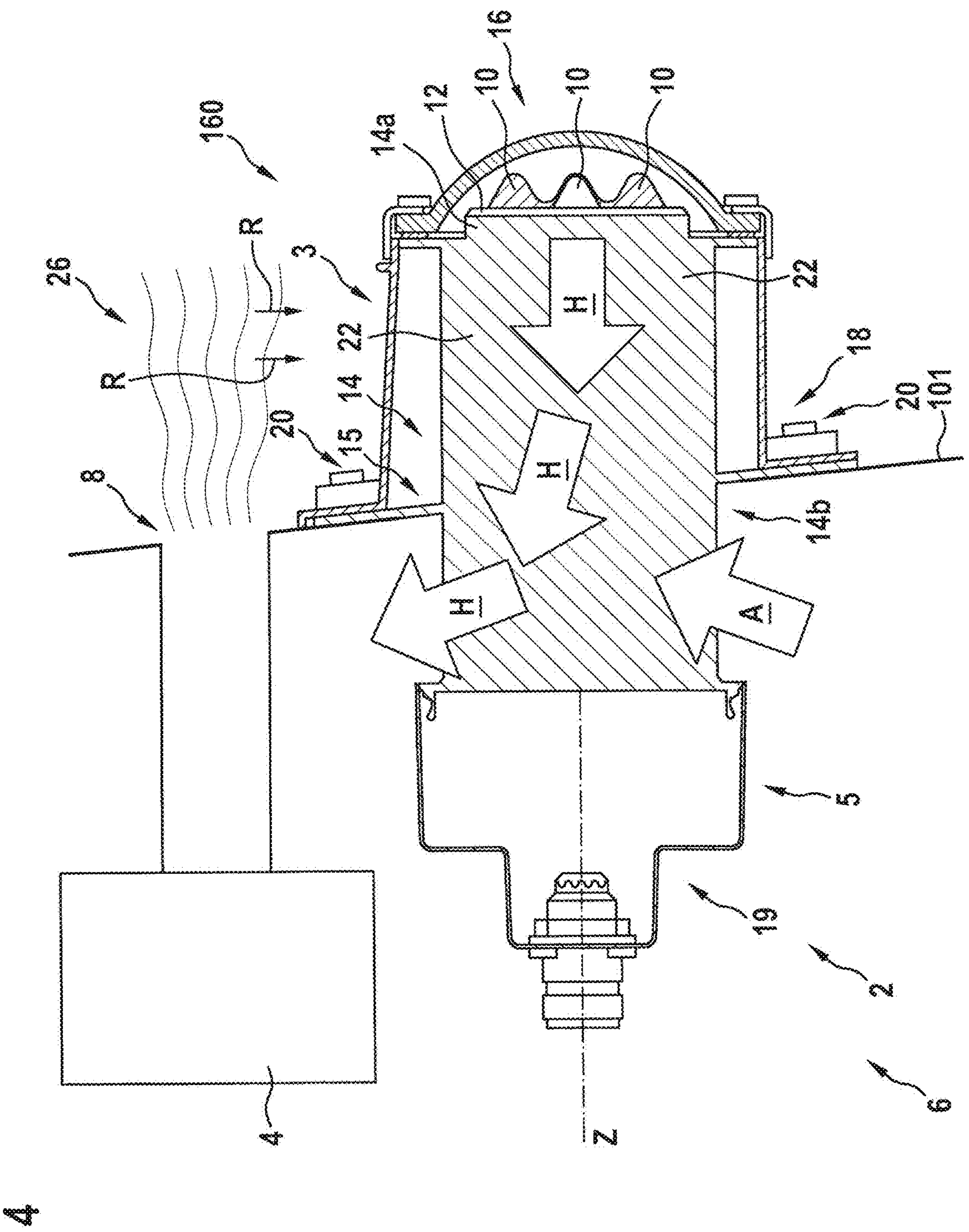
FIG. 4 depicts an enlarged cross-sectional view of a tail of an aircraft, the aircraft including an aircraft tail light according to an exemplary embodiment of the invention.

FIG. 4 depicts an enlarged cross-sectional view of a tail 160 of an aircraft 100 in accordance with an exemplary embodiment of the invention, the aircraft 100 including an auxiliary power unit 4 and an aircraft tail light 2 according to an exemplary embodiment of the invention, mounted to the tail 160 of the aircraft 100. The aircraft tail light 2 is in particular arranged below a gas exhaust 8 of the auxiliary power unit 4, which is arranged in an auxiliary power unit bay 6 formed within the tail 160 of the aircraft 100.

The aircraft tail light 2 comprises a plurality of light sources 10, in particular LEDs 10, for generating a light output of the aircraft tail light 2.

The light sources 10 are mounted to and supported by a light source support 12. The light source support 12 may in particular be a printed circuit board (PCB), comprising conductive paths (not shown) for supplying electric energy to the light sources 10.

The light sources 10 and the light source support 12 are arranged in an aircraft exterior portion 3 of the aircraft tail light 2, which is arranged outside the aircraft 100. The light sources 10 are covered by a protective cover 16, which protects the lights sources 10 from mechanical impact and from water, moisture, dirt, etc.

The protective cover 16 is at least partially light transmissive, allowing light, which is emitted by the light sources 10, to pass through the protective cover 16.

The light source support 12 is thermally coupled to a heat transfer structure 14, which is provided for dispensing heat from the light sources 10. The heat transfer structure 14 may also be referred to as heat sink, because the heat from the light sources 10 is sunk thereto.

The heat transfer structure 14 comprises a heat receiving portion 14*a*, which is thermally coupled with the light sources 10 for absorbing heat from the light sources 10. The heat transfer structure 14 further comprises a heat dispensing portion 14*b* for dispensing heat from the heat transfer structure 14.

The heat transfer structure 14 extends from the aircraft exterior portion 3 of the aircraft tail light 2 into an aircraft interior portion 5 of the aircraft tail light 2. The heat receiving portion 14*a* of the heat transfer structure 14 is arranged in the aircraft exterior portion 3 of the aircraft tail light 2. The heat dispensing portion 14*b* of the heat transfer structure 14 is arranged in the aircraft interior portion 5 of the aircraft tail light 2.

The aircraft interior portion 5, housing the heat dispensing portion 14*b* of the heat transfer structure 14, is in particular arranged within the auxiliary power unit bay 6 formed in the aircraft 100.

The heat transfer structure 14 may be made of a material having a good thermal conductivity. The heat transfer structure 14 may, in particular, be made of metal having a good thermal conductivity, such as aluminum.

The aircraft tail light 2 further comprises an exterior mounting structure 18 for fixing the aircraft tail light 2 to an aircraft skin 101 of the aircraft 100. The aircraft tail light 2 may in particular be fixed to the aircraft skin 101 in a configuration, in which the aircraft exterior portion 3 of the aircraft tail light 2, including the heat receiving portion 14*a* of the heat transfer structure 14, is located on an outside of the aircraft skin 101 and in which the aircraft interior portion 5, including the heat dispensing portion 14*b* of the heat transfer structure 14, is located on an inside of the aircraft skin 101.

The exterior mounting structure 18 may include a housing, which is arranged outside of the aircraft skin 101 for housing the heat receiving portion 14*a* of the heat transfer structure 14 and supporting the protective cover 16.

The exterior mounting structure 18 may be fully or partially made of a thermally insulating material for insulating and protecting the interior of the aircraft tail light 2 from hot air streams passing by the aircraft tail light 2; in particular from hot exhaust gas streams, streaming out of the gas exhaust 8 of the auxiliary power unit 4. The exterior mounting structure 18 may be fully made of such thermally insulating material. It is also possible that only part of the exterior mounting structure 18 are made of such thermally insulating material. For example, it is possible that the housing for the heat receiving portion 14*a* of the heat transfer structure 14 is made from such thermally insulating material.

The exterior mounting structure 18/parts thereof may, in particular, be made of a thermally insulating high temperature resistant material, which is capable to withstand up to 200° C. and which is inert against corrosive media. The exterior mounting structure 18/parts thereof may, for example, be made of a material comprising at least one of PES, PPS, PPSU and PEEK/PEKK.

In addition/alternatively, the protective cover 16 may be made from a thermally insulating material. In particular, the protective cover 16 may be made of a thermally insulating high temperature resistant material, which is capable to withstand up to 200° C. and which is inert against corrosive media. The protective cover 16 may, for example, be made of a material comprising at least one of PES, PPS, PPSU and PEEK/PEKK.

The exterior mounting structure 18 may be fixed to the aircraft skin 101 by screws and/or bolts 20, extending through a base portion of the exterior mounting structure 18 and the aircraft skin 101.

The heat transfer structure 14 may comprise a mounting portion 15, such as a collar extending from an outer periphery of the heat transfer structure 14 in between the heat receiving portion 14a and the heat dispensing portion 14b, which is configured to be fixed to the aircraft skin 101 by the screws or bolts 20.

In addition to the exterior mounting structure 18, an interior mounting structure 19 may be provided in the interior of the aircraft 100, in particular in the auxiliary power unit bay 6, for receiving and supporting an inner end portion of the heat transfer structure 14, in particular an inner end portion of the heat dispensing portion 14b of the heat transfer structure 14.

The interior mounting structure 19, the exterior mounting structure 18, and the protective cover 16 may be spaced along an axis Z, which may be substantially aligned with the longitudinal extension of the aircraft 100. The heat transfer structure 14 may extend along this axis Z between the heat receiving portion 14a and the heat dispensing portion 14b.

For further enhancing the dispensation of heat from the heat transfer structure 14, the heat transfer structure 14 may comprise a plurality of heat transfer ribs 22, extending between the aircraft exterior portion 3 and the aircraft interior portion 5 of the aircraft tail light 2. In the exemplary embodiment of FIG. 4, the cross-sectional plane runs through one of said heat transfer ribs 22.

When the light sources 10 of the aircraft tail light 2 are operated and produce heat, at least a portion of said heat is received by the heat receiving portion 14a of the heat transfer structure 14 and is transferred to the heat dispensing portion 14b of the heat transfer structure 14. From the heat dispensing portion 14b, the heat is dispensed to the environment of the heat dispensing portion 14b. The heat may in particular be dispensed into the auxiliary power unit bay 6 of the aircraft 100. In FIG. 4, the transfer of heat from the light sources 10 into the auxiliary power unit bay 6 is schematically illustrated by arrows H.

Dispensing the heat from the heat dispensing portion 14b of the heat transfer structure 14 may be supported and enhanced by an air flow A, passing the heat dispensing portion 14b. This air flow A may be driven thermally, i.e. by a difference in temperature between an upper portion of the auxiliary power unit bay 6 and a lower portion of the auxiliary power unit bay 6.

This temperature difference may be caused by the heat H transferred from the light sources 10 into the auxiliary power unit bay 6 via the heat transfer structure 14, as it has been described before.

When the auxiliary power unit 4 is operated, the heat emitted by the auxiliary power unit 4 and by the hot exhaust gases of the auxiliary power unit 4, streaming through the gas exhaust 8, may add to the temperature gradient formed within the auxiliary power unit bay 6, additionally driving the air flow A, flowing through the auxiliary power unit bay 6, and enhancing the dissipation of heat from the heat dispensing portion 14b of the heat transfer structure 14.

When the auxiliary power unit 4 is operated, the temperatures within the auxiliary power unit bay 6 may rise to temperatures in the range of between 50° C. and 90° C., in particular to temperatures in the range of between 60° C. and 80° C., more particularly to temperatures in the range of between 65° C. and 75° C. Such temperatures have been found to be sufficiently low for transferring a substantial amount of heat from the light sources 10 into the auxiliary power unit bay 6 and to the air flow A, passing the heat dispensing portion 14b of the heat transfer structure 14, in order to cool the light sources 10 and to prevent damaging or even destroying the light sources 10 due to overheating.

Figure 5:
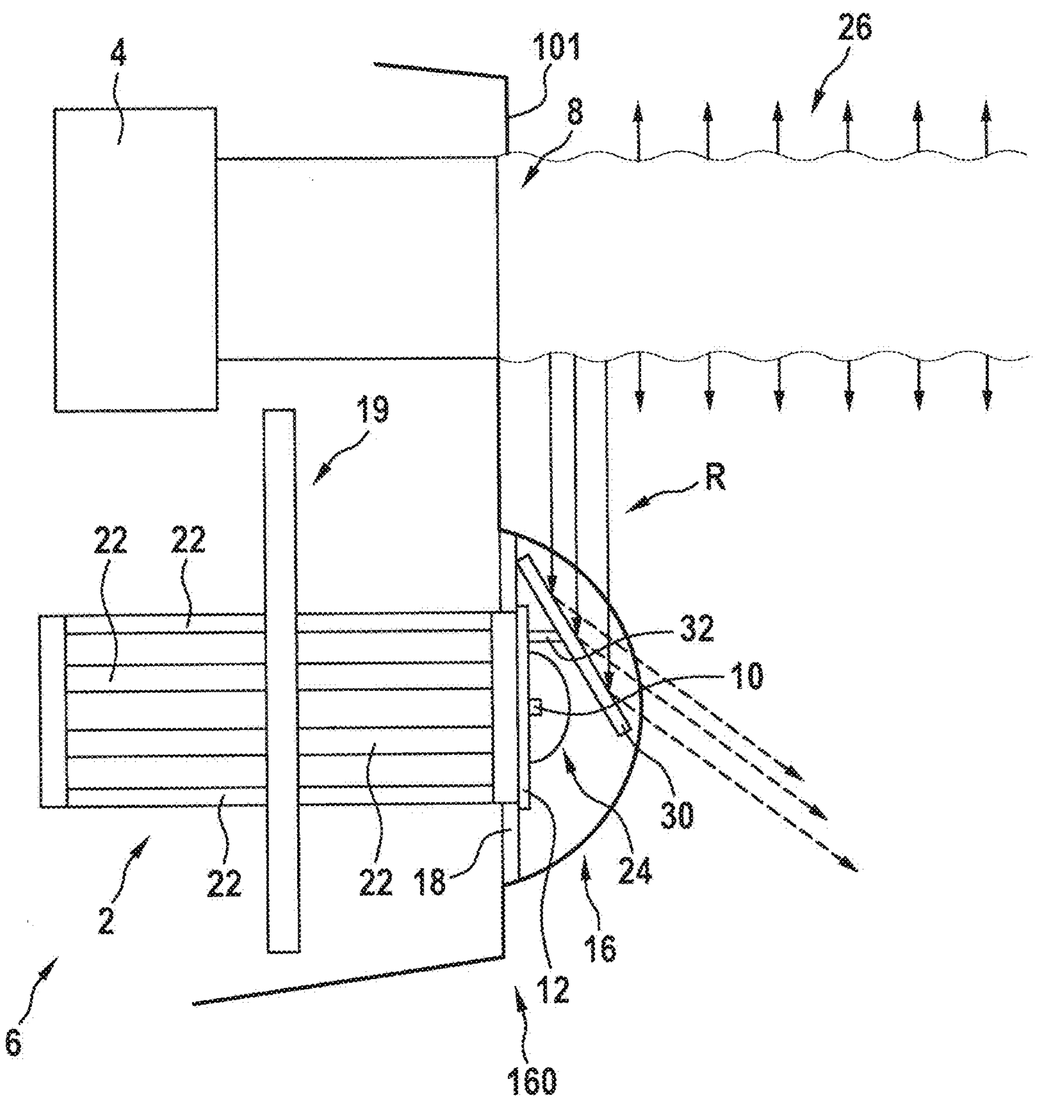
FIG. 5 depicts an enlarged cross-sectional view of a tail of an aircraft, the aircraft including an aircraft tail light according to an exemplary embodiment of the invention comprising a thermal shield.

FIG. 5 depicts an enlarged cross-sectional view of a tail 160 of an aircraft 100 according to an exemplary embodiment of the invention, the aircraft including an auxiliary power unit 4 and an aircraft tail light 2 according to another exemplary embodiment of the invention.

The features of the aircraft tail light 2, as depicted in FIG. 5 and corresponding to the features of the embodiment depicted in FIG. 4, are denoted with the same reference signs, and they are not discussed in detail again. The description of these features, as provided with respect to FIG. 4, correspondingly applies to the embodiment depicted in FIG. 5.

In the embodiment depicted in FIG. 5, an optical element 24 is arranged between a light source 10 and the protective cover 16. The light source 10 may in particular be embedded within the optical element 24. The optical element 24 is configured for forming a light output of the aircraft tail light 2 from light emitted by the light source 10.

A single light source 10 is depicted in FIG. 5, and it is possible to provide an aircraft tail light 2 in accordance with an exemplary embodiment of the invention with a single light source 10. However, the aircraft tail light 2 depicted in FIG. 5 may comprise a plurality of light sources 10 as well. In case the aircraft tail light 2 comprises a plurality of light sources 10, the aircraft tail light 2 may comprise a single optical element 24, configured for forming the light output of the aircraft tail light 2 from light emitted by the plurality of light sources 10.

Alternatively, the aircraft tail light 2 may comprise a plurality of optical elements 24 for forming the light output of the aircraft tail light 2 from light emitted by the plurality of light sources 10. The aircraft tail light 2 may in particular comprise the same number of optical elements 24 as light sources 10, with each optical element 24 being assigned to one of the plurality of light sources 10, respectively.

In the embodiment depicted in FIG. 5, the aircraft tail light 2 further comprises a thermal shield 30, configured for shielding the at least one light source 10 from heat provided by hot exhaust gases 26 expelled through the gas exhaust 8.

The thermal shield 30 may be supported by a shield support structure 32. The shield support structure 32 may be configured for supporting the thermal shield 30 on the light source support 12, as depicted in FIG. 5. Alternatively or additionally, the shield support structure 32 may be configured for supporting the thermal shield 30 on the exterior mounting structure 18 and/or on the protective cover 16.

The thermal shield 30 may have a flat shape, as it is depicted in FIG. 5. A thermal shield 30 having a flat shape may be produced relatively easily and at comparatively low costs.

In alternative embodiments, which are not explicitly shown in the figures, the thermal shield 30 may have a curved shape or a partially curved shape, such partially curved shape including at least one flat portion and at least one curved portion. A thermal shield 30 having an at least partially curved shape may be more efficient in shielding the light source 10 from heat, particularly from infrared radiation R. Also, an at least partially curved shape may be embedded into the aircraft tail light 2 more easily.

In the embodiment depicted in FIG. 5, the thermal shield 30 is arranged in between the optical element 24 and the protective cover 16. In such a configuration, the thermal shield 30 is protected by the protective cover 16.

In alternative embodiments, which are not explicitly shown in the figures, the thermal shield 30 may be arranged outside the protective cover 16. In a configuration in which the thermal shield 30 is arranged outside the protective cover 16, the temperature in the interior space, defined by the protective cover 16, may be reduced, since the thermal shield 30 may prevent a substantial portion of the infrared radiation R from entering into the interior space.

The thermal shield 30 may comprise a hot mirror, which is reflective for infrared radiation R. The hot mirror may be substantially more reflective for electromagnetic radiation in the infrared range than for electromagnetic radiation in the range of visible light. The hot mirror may, in particular, allow visible light, which is emitted by the light source 10, to pass through the thermal shield 30 without substantial losses. The hot mirror may, for example, be configured for reflecting at least 80%, in particular at least 90%, of infrared radiation R, which impinges on the hot mirror, and for reflecting less than 20%, in particular less than 10%, of radiation in the range of visible light, which impinges on the hot mirror.

The hot mirror may be made of a material comprising an optically transparent carrier, such as glass, and a sub-micron thick coating that reflects radio-magnetic emissions beyond the visible range, such as an indium tin oxide (ITO) coating or another suitable combination of dielectric and metallic coatings. In a particular example, the hot mirror may be made of a borosilicate or soda-lime glass with a multilayer ITO coating, creating a set of interferences suited to pass through visible light and block/reflect infrared light.

As compared to the embodiment of FIG. 4, the heat transfer ribs are arranged within the auxiliary power unit bay 6 to a larger extent. Still, the heat transfer structure 14 is partially arranged in the aircraft exterior portion of the aircraft tail light 2 and partially arranged in the aircraft interior portion of the aircraft tail light 2, because the heat reception takes place at the light source 10/light source support 12 in the exterior portion of the aircraft tail light 2.

Figure 6:
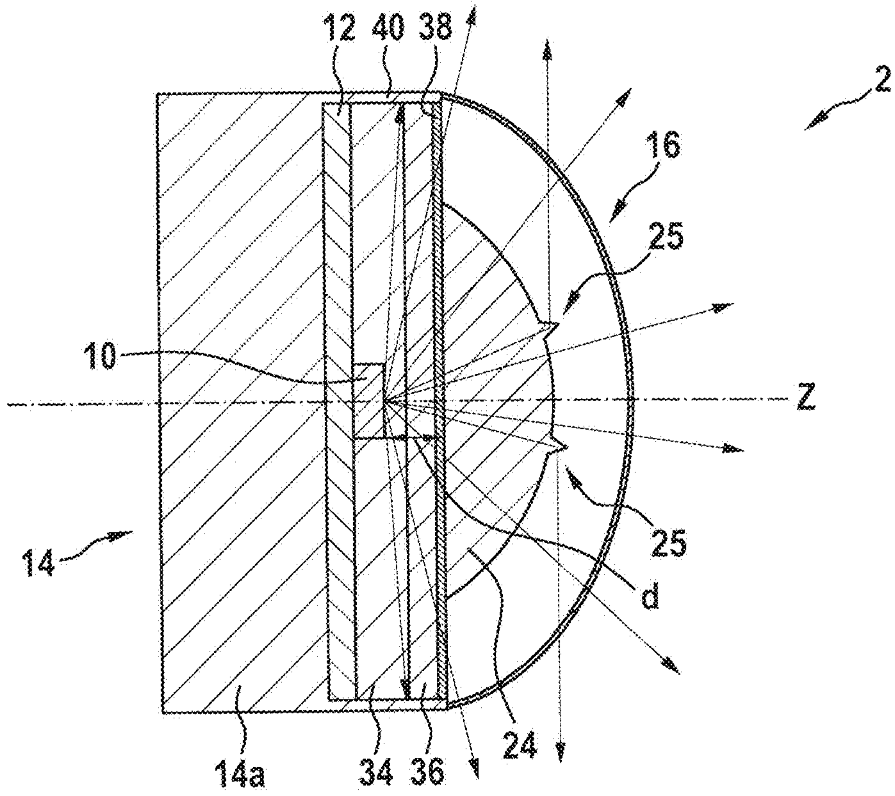
FIG. 6 depicts a cross-sectional view of an aircraft tail light according to an exemplary embodiment of the invention comprising a flat infrared reflective layer.

FIG. 6 depicts a schematic cross-sectional view of an aircraft tail light 2 according to another exemplary embodiment of the invention.

For simplifying the illustration, only the heat receiving portion 14*a* of the heat transfer structure 14 is depicted in FIG. 6, and no portions of the aircraft 100 are depicted in FIG. 6.

Although only a single light source 10 is shown in FIG. 6, the aircraft tail light 2 depicted in FIG. 6 may comprise a plurality of light sources 10 as well.

Similar to the embodiments depicted in FIGS. 4 and 5, the light source 10 is supported by a flat light source support 12, which may, in particular, be a printed circuit board.

In the embodiment depicted in FIG. 6, the light source 10 is embedded within a silicone layer 34. A flat glass plate 36 is arranged on the silicon layer, distal from the light source support 12. As a result, the light source 10 and the silicone layer 34 are sandwiched between the light source support 12 and the glass plate 36.

For protecting the light source 10 from infrared radiation R, which is emitted from hot exhaust gases 26, expelled through the gas exhaust 8 (cf. FIGS. 2, 4, and 5), an infrared reflective layer or coating 38, providing a hot mirror, is formed on the outer surface of the glass plate 36, i.e. on the side of the glass plate 36 facing away from the light source 10.

The infrared reflective layer or coating 38 is reflective for infrared radiation R. The infrared reflective layer or coating 38 may, in particular, be much more reflective for electromagnetic radiation in the infrared range than for electromagnetic radiation in the range of visible light, in order to allow visible light, which is emitted by the light source 10, to pass through the infrared reflective layer or coating 38 without substantial losses. The infrared reflective layer or coating 38 may, for example, be configured for reflecting at least 80%, in particular at least 90% of infrared radiation R, which impinges on the infrared reflective layer or coating 38, and for reflecting less than 20%, in particular less than 10%, of radiation in the range of visible light, which impinges on the infrared reflective layer or coating 38.

The infrared reflective layer or coating 38 may be made of an indium tin oxide (ITO) composition or another suitable composition. In particular, the infrared reflective layer or coating 38 may be an indium tin oxide (ITO) coating. The ITO coating may be a multilayer ITO coating creating a set of interferences suited to pass through visible light and block/reflect infrared light.

An optical element 24, which is configured for forming a light output of the aircraft tail light 2 from light emitted by the light source 10, is formed on the side of the infrared reflective layer or coating 38 facing away from the light source 10.

The optical element 24 and the infrared reflective layer or coating 38 are covered by a protective cover 16. The protective cover 16 may have the shape of a dome.

For housing, supporting and protecting the silicone layer 34, the glass plate 36 and the infrared reflective layer or coating 38, the aircraft tail light 2 is formed with a peripheral wall 40. The peripheral wall 40 encases the stack formed by the silicone layer 34, the glass plate 36 and the infrared reflective layer or coating 38 along a circumferential periphery of the aircraft tail light 2.

In such an embodiment, the light source 10 may be arranged within the aircraft tail light 2 in some distance from the outer edge of the peripheral wall 40. This may cause the peripheral wall 40 to block a portion of the light emitted by the light source 10.

In order to allow for providing an aircraft tail light 2 generating a light output having an opening angle of at least 140°, as required by aircraft safety standards for e.g. tail navigation lights, the optical element 24 depicted in FIG. 6 is provided with two protrusions 25. The two protrusions 25 are configured for redirecting a portion of the light emitted by the light source 10 for generating a light output having an opening angle of at least 140° and up to 180°, as it is schematically depicted in FIG. 6. The shapes of the two protrusions 25 depicted in FIG. 6 are only exemplary. Other shapes of the protrusions 25 are possible as well. Further, an aircraft tail light 2 according to an exemplary embodiment of the invention may comprise more or less than the two protrusions 25.

An aircraft tail light 2 according to the embodiment depicted in FIG. 6 may be produced relatively easily, since only flat layers 34, 36, 48 need to be applied to the light source support 12.

Figure 7:
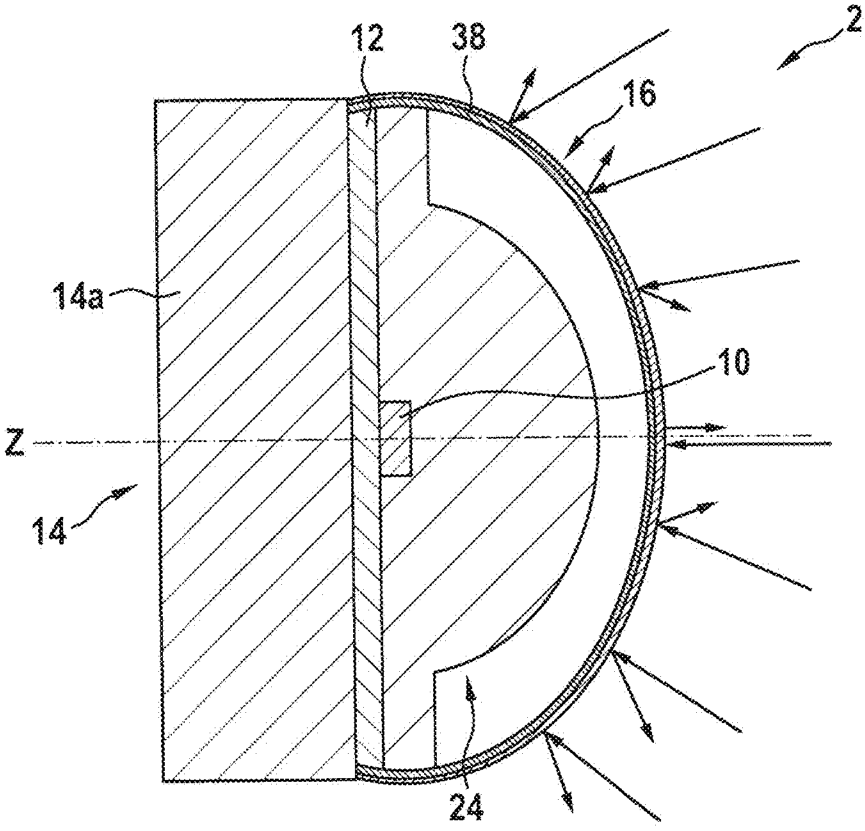
FIG. 7 depicts a cross-sectional view of an aircraft tail light according to an exemplary embodiment of the invention comprising a curved infrared reflective layer.

FIG. 7 depicts a schematic cross-sectional view of an aircraft tail light 2 according to yet another exemplary embodiment of the invention.

In order to simplify the illustration, only the heat receiving portion 14*a* of the heat transfer structure 14 is depicted in FIG. 7, and no portions of the aircraft 100 are shown.

Although only a single light source 10 is depicted in FIG. 7, the aircraft tail light 2 depicted in FIG. 7 may comprise a plurality of light sources 10 as well.

Similar to the embodiments depicted in FIGS. 4, 5 and 6, the light source 10 is supported by a flat light source support 12, which may be a printed circuit board.

In the embodiment depicted in FIG. 7, the optical element 24 is formed directly on the light source support 12 and the light source 10 is embedded within the optical element 24.

The optical element 24 may, for example, be made of silicone or a material comprising silicone. Silicone may withstand temperatures of up to at least 200° C.

The optical element 24 is covered by a protective cover 16, which may have the shape of a dome.

An infrared reflective layer or coating 38, providing a hot mirror, is provided on the inside of the protective cover 16, facing the optical element 24 and the light source 10. The infrared reflective layer or coating 38 may, in particular, be an infrared reflective coating, which is applied to at least a portion of the inner surface of the protective cover 16.

The infrared reflective layer or coating 38 is reflective for infrared radiation R. The infrared reflective layer or coating 38 may be much more reflective for electromagnetic radiation in the infrared range than for electromagnetic radiation in the range of visible light, in order to allow visible light, which is emitted by the light source 10, to pass through the infrared reflective layer or coating 38 without substantial losses. The infrared reflective layer or coating 38 may, for example, be configured for reflecting at least 80%, in particular at least 90% of infrared radiation R, which impinges on the infrared reflective layer or coating 38, and for reflecting less than 20%, in particular less than 10%, of radiation in the range of visible light, which impinges on the infrared reflective layer or coating 38.

The infrared reflective layer or coating 38 may, for example, comprise an indium tin oxide (ITO) composition or another suitable composition. In particular, the infrared reflective layer or coating 38 may be an indium tin oxide (ITO) coating. The ITO coating may be a multilayer ITO coating creating a set of interferences suited to pass through visible light and block/reflect infrared light.

As a result, a large portion of infrared radiation R that impinges on the protective cover 16 is reflected by the infrared reflective layer or coating 38 and is thereby prevented from entering into the interior space of the aircraft tail light 2, which is defined by the protective cover 16.

In consequence, the light source 10 and the optical element 24 of the aircraft tail light 2 may be prevented from being damaged or destroyed due to overheating caused by infrared radiation R impinging onto the aircraft tail light 2, in particular by infrared radiation R emitted from hot exhaust gases 26 expelled through the gas exhaust 8 of the auxiliary power unit 4 (cf. FIGS. 2, 4, and 5).

The infrared reflective layer or coating 38, applied to the inner surface of the protective cover 16, protects the optical element 24 from infrared radiation R as well. It further prevents the infrared radiation R from entering into the interior space of the aircraft tail light 2, which is defined by the optical element 24 and the protective cover 16. As a result, it may be possible to limit the maximum temperature, to which the light source 10 is exposed, when the aircraft tail light 2 and the auxiliary power unit 4 are operated, to even lower temperatures. In consequence, it may be possible to extend the lifetime of the light source 10, since the thermally induced stress may be reduced.

The structure of the exemplary embodiment of an aircraft tail light 2 depicted in FIG. 7 may be less complex than the structure of the exemplary embodiment of an aircraft tail light 2 depicted in FIG. 6. This may allow for manufacturing and assembling the embodiment of an aircraft tail light 2 depicted in FIG. 7 more easily and at lower costs than the embodiment of an aircraft tail light 2 depicted in FIG. 6.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft tail light for being installed adjacent a hot gas exhaust of an aircraft, the aircraft tail light comprising:

at least one light source for generating a light output of the aircraft tail light; and a heat transfer structure comprising a heat receiving portion, thermally coupled with the at least one light source for absorbing heat (H) from the at least one light source, and a heat dispensing portion for dispensing heat (H) from the heat transfer structure;

wherein the at least one light source is arranged in an aircraft exterior portion of the aircraft tail light and wherein the heat transfer structure extends from the aircraft exterior portion of the aircraft tail light to an aircraft interior portion of the aircraft tail light, with the heat receiving portion being arranged in the aircraft exterior portion of the aircraft tail light and the heat dispensing portion being arranged in the aircraft interior portion of the aircraft tail light, and wherein the heat transfer structure comprises a plurality of heat transfer ribs extending at least partially into the aircraft exterior portion and at least partially into the aircraft interior portion of the aircraft tail light.

2. The aircraft tail light according to claim 1, further comprising:

a mounting structure for fixing the aircraft tail light to an aircraft skin of the aircraft;

wherein the mounting structure is configured to fix the aircraft tail light to the aircraft skin with the aircraft exterior portion on an outside of the aircraft skin and with the aircraft interior portion on an inside of the aircraft skin.

3. The aircraft tail light according to claim 1, configured to be installed adjacent the hot gas exhaust of the aircraft with the aircraft interior portion being arranged in an auxiliary power unit bay of the aircraft.

4. The aircraft tail light according to claim 1, wherein the heat dispensing portion is configured for dispensing the heat (H) to an air flow (A), passing the heat dispensing portion within the aircraft.

5. The aircraft tail light according to claim 1, further comprising a mounting portion configured to be attached to a skin of the aircraft, wherein the plurality of heat transfer ribs extend at least partially between the mounting portion and the at least one light source.

6. The aircraft tail light according to claim 1, further comprising a thermal shield for shielding the at least one light source from heat from the hot gas exhaust, to which the aircraft tail light is exposed.

7. The aircraft tail light according to claim 6, wherein the thermal shield comprises a hot mirror, which is reflective for infrared radiation, wherein the hot mirror is in particular substantially more reflective for infrared radiation than for visible light.

8. The aircraft tail light according to claim 6, wherein the aircraft tail light comprises a support structure for supporting the thermal shield, and/or wherein the thermal shield has a flat shape.

9. The aircraft tail light according to claim 6, wherein the aircraft tail light comprises at least one optical element for forming the light output of the aircraft tail light from light emitted by the at least one light source, and wherein the thermal shield is arranged between the at least one optical element and the at least one light source and/or wherein the thermal shield is provided as a reflective layer or coating applied to the at least one optical element, wherein the reflective layer or coating is in particular applied to a surface of the at least one optical element facing the at least one light source.

10. The aircraft tail light according to claim 1, wherein the aircraft tail light comprises a protective cover, which is at least partially formed from a thermally insulating material;

wherein the thermally insulating material in particular comprises at least one of PES, PPS, PPSU and PEEK/PEKK.

11. The aircraft tail light according to claim 1, wherein the aircraft tail light is one of an aircraft navigation light, an aircraft anti-collision light, and a combined aircraft navigation and anti-collision light.

12. An aircraft comprising:

a hot gas exhaust for discharging hot exhaust gases from the aircraft;

an aircraft tail light according to claim 1, installed adjacent the hot gas exhaust, such as to be exposed to hot exhaust gases discharged through the hot gas exhaust;

wherein the aircraft tail light is mounted to the aircraft with the heat dispensing portion of the heat transfer structure being arranged in a cavity formed within the aircraft.

13. The aircraft according to claim 12, comprising an auxiliary power unit, wherein the hot gas exhaust is an exhaust of the auxiliary power unit, and wherein the cavity is an auxiliary power unit bay, housing the auxiliary power unit.

14. The aircraft according to claim 12, wherein the cavity is configured such that an air flow (A), in particular a thermally driven air flow (A), passes by the heat dispensing portion of the heat transfer structure;

wherein the air flow (A) in particular has a temperature in the range of between 50° C. and 90° C., more particularly a temperature in the range of between 60° C. and 80° C., even more particularly a temperature in the range of between 65° C. and 75° C.

15. A method of operating the aircraft tail light according to claim 1, wherein the method includes:

operating the at least one light source for generating the light output of the aircraft tail light; and passing an air flow (A) through a cavity, formed within the aircraft, for dissipating heat (H) from the heat dispensing portion of the heat transfer structure;

wherein the air flow (A) has in particular a temperature in the range of between 50° C. and 90° C., more particularly a temperature in the range of between 60° C. and 80° C., even more particularly a temperature in the range of between 65° C. and 75° C.

16. The aircraft tail light according to claim 1, wherein each rib of the plurality of heat transfer ribs extends at least partially into the aircraft exterior portion and at least partially into the aircraft interior portion.

* * * * *